United States Patent
Miyata et al.

(10) Patent No.: US 8,148,033 B2
(45) Date of Patent: Apr. 3, 2012

(54) FUEL CELL SYSTEM WITH SUPPRESSED NOISE AND VIBRATION

(75) Inventors: Koichiro Miyata, Saitama (JP); Satoshi Aoyagi, Saitama (JP); Kenichiro Ueda, Saitama (JP); Junji Uehara, Saitama (JP); Takuya Shirasaka, Saitama (JP); Yuji Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 355 days.

(21) Appl. No.: 12/470,089

(22) Filed: May 21, 2009

(65) Prior Publication Data

US 2009/0291341 A1 Nov. 26, 2009

(30) Foreign Application Priority Data

May 21, 2008 (JP) .................................. 2008-133615

(51) Int. Cl.
*H01M 2/14* (2006.01)

(52) U.S. Cl. ........ 429/513; 429/429; 429/433; 429/444; 429/465

(58) Field of Classification Search .................. 429/444, 429/465, 513, 474, 433, 429
See application file for complete search history.

(56) References Cited

U.S. PATENT DOCUMENTS

| | | | |
|---|---|---|---|
| 6,859,708 B2 * | 2/2005 | Hashimoto et al. | 701/48 |
| 7,282,286 B2 * | 10/2007 | Hayashi et al. | 429/429 |
| 2002/0091475 A1 * | 7/2002 | Hashimoto et al. | 701/48 |

FOREIGN PATENT DOCUMENTS

| | | |
|---|---|---|
| JP | 6-193579 | 7/1994 |
| JP | 2003-254250 | 9/2003 |
| JP | 2004-152679 | 5/2004 |
| JP | 2007-194177 | 8/2007 |

OTHER PUBLICATIONS

Japanese Notification of Reason for Refusal for Application No. 2008-133615, dated Feb. 23, 2010.

* cited by examiner

*Primary Examiner* — Patrick Ryan
*Assistant Examiner* — Alex Usyatinsky
(74) *Attorney, Agent, or Firm* — Nelson Mullins Riley & Scarborough LLP; Anthony A. Laurentano

(57) ABSTRACT

An object of the present invention is to provide a fuel cell system in which a noise and a vibration of a compressor can be suppressed. In order to achieve the above object, the present invention provides a fuel cell system including a fuel cell; a compressor for supplying an oxidant gas to the fuel cell, having a first rotational speed region within which as a rotational speed increases, a noise becomes greater than a predetermined value, and a second rotational speed region within which as the rotational speed increases, the noise becomes equal to or less than the predetermined value; and a compressor controller for controlling the compressor by calculating a command rotational speed for commanding the compressor based on a required amount of power generation.

10 Claims, 5 Drawing Sheets

_US 8,148,033 B2_

FUEL CELL SYSTEM WITH SUPPRESSED NOISE AND VIBRATION

CROSS REFERENCE TO RELATED APPLICATIONS

The present application claims benefit of the filing date of Japanese Patent Application No. 2008-133615 filed on May 21, 2008 which is incorporated herein by reference.

FIELD OF THE INVENTION

The present invention relates to a fuel cell system.

DESCRIPTION OF THE RELATED ART

Recently, studies have been widely made to develop a fuel cell, such as a polymer electrolyte fuel cell (PEFC), in which an electric power is generated by using a hydrogen (fuel gas, reaction gas) supplied to an anode and an oxygen-containing air (oxidant gas, reaction gas) supplied to a cathode.

Usually, such air is supplied from a compressor, and a rotational speed (rpm) of the compressor is controlled based on a required amount of power generation for a fuel cell. That is, the required amount of power generation for the fuel cell is proportional to the rotational speed of the compressor. Therefore, when the required amount of power generation is increased, the rotational speed of the compressor is increased in order to supply air to the cathode at a flow rate higher than the usual flow rate (see JP 2007-194177 A).

By the way, when the compressor is operated, there are a first rotational speed region in which a bladed wheel and a body (enclosure) of the compressor vibrate, a phase of the bladed wheel approximately coincides with that of the body (enclosure) in response to the rotational speed, and a noise and a vibration are greater than predetermined values, and a second rotational speed region in which the phase of the bladed wheel differs from that of the body, and the noise and the vibration are equal to or less than the predetermined values.

And, in the prior art, even if the command rotational speed of the compressor calculated based on the required amount of power generation is within the first rotational speed region, a noise and a vibration generated by the compressor may be greater than the predetermined values because the compressor is controlled based on the calculated command rotational speed. Such noise and vibration are noticeable in a fuel cell vehicle, etc. on which an engine is not mounted.

Therefore, an object of the present invention is to provide a fuel cell system in which a noise and a vibration of a compressor can be suppressed.

SUMMARY OF THE INVENTION

In order to achieve the above object, the present invention provides a fuel cell system including a fuel cell; a compressor for supplying an oxidant gas to the fuel cell, having a first rotational speed region within which as a rotational speed increases, a noise becomes greater than a predetermined value, and a second rotational speed region within which as the rotational speed increases, the noise becomes equal to or less than the predetermined value; and a compressor controlling means for controlling the compressor by calculating a command rotational speed for commanding the compressor based on a required amount of power generation, in which the compressor controlling means prohibits the compressor from rotating at a rotational speed within the first rotational speed region, and when the command rotational speed within the first rotational speed region is calculated, the command rotational speed is changed to a rotational speed within the second rotational speed region which is above the first rotational speed region, or the command rotational speed is changed to a rotational speed within the second rotational speed region which is below the first rotational speed region.

According to the above described fuel cell system, when the compressor controlling means prohibits the compressor from rotating at the rotational speed within the first rotational speed region, and the command rotational speed within the first rotational speed region is calculated, the command rotational speed is changed to a rotational speed within the second rotational speed region which is above the first rotational speed region, or the command rotational speed is changed to a rotational speed within the second rotational speed region which is below the first rotational speed region. This allows the command rotational speed of the compressor to be out of the first rotational speed region. As a result, a noise of the compressor can be reduced to or below the predetermined value to suppress the noise of the compressor.

Also, the present invention provides a fuel cell system including a fuel cell; a compressor for supplying an oxidant gas to the fuel cell, having a first rotational speed region within which as a rotational speed increases, a vibration becomes greater than a predetermined value, and a second rotational speed region within which as the rotational speed increases, the vibration becomes equal to or less than the predetermined value, and the first rotational speed region alternates with the second rotational speed region; and a compressor controlling means for controlling the compressor by calculating a command rotational speed for commanding the compressor based on a required amount of power generation, in which the compressor controlling means prohibits the compressor from rotating at a rotational speed within the first rotational speed region, and when the command rotational speed within the first rotational speed region is calculated, the command rotational speed is changed to a rotational speed within the second rotational speed region which is above the first rotational speed region, or the command rotational speed is changed to a rotational speed within the second rotational speed region which is below the first rotational speed region.

According to the above described fuel cell system, when the compressor controlling means prohibits the compressor from rotating at the rotational speed within the first rotational speed region, and the command rotational speed within the first rotational speed region is calculated, the command rotational speed is changed to a rotational speed within the second rotational speed region which is above the first rotational speed region, or the command rotational speed is changed to a rotational speed within the second rotational speed region which is below the first rotational speed region. This allows the command rotational speed of the compressor to be out of the first rotational speed region. As a result, a vibration of the compressor can be reduced to or below the predetermined value to suppress the vibration of the compressor.

Also, the present invention provides a fuel cell system including a power generation controlling means for controlling power generation of the fuel cell; a battery for charging/discharging an electric power generated by the fuel cell; a SOC detecting means for detecting a state of charge (SOC) of the battery; and a battery controlling means for controlling the charging/discharging of the battery, in which when the command rotational speed within the first rotational speed region is calculated, if the SOC detected by the SOC detecting means is equal to or greater than a first SOC, the compressor controlling means changes the command rotational speed to a rotational speed within the second rotational speed region, the power generation controlling means allows the fuel cell to generate less electric power, and the battery controlling means allows the battery to discharge in order to compensate for an insufficient power generation of the fuel cell, and if the SOC detected by the SOC detecting means is less than the first SOC, the compressor controlling means changes the command rotational speed to the rotational speed within the second rotational speed region, the power generation controlling means allows the fuel cell to generate more electric power, and the battery controlling means allows the battery to be charged with an excess electric power of the fuel cell.

According to the above described fuel cell system, when the command rotational speed within the first rotational speed region is calculated, if the SOC detected by the SOC detecting means is equal to or greater than the first SOC, the compressor controlling means changes the command rotational speed to the rotational speed within the second rotational speed region. As a result, a noise and a vibration of the compressor can be reduced to or below the predetermined value. In response to this, because the power generation controlling means allows the fuel cell to generate less electric power, insufficient oxidant gas in the fuel cell can be prevented. And, because the battery controlling means allows the battery to discharge in order to compensate for the insufficient power generation of the fuel cell, an electric power corresponding to the required amount of power generation is output from the fuel cell and the battery.

On the other hand, when the command rotational speed within the first rotational speed region is calculated, if the SOC detected by the SOC detecting means is less than the first SOC, the compressor controlling means changes the command rotational speed to the rotational speed within the second rotational speed region. As a result, the noise and the vibration of the compressor can be reduced to or below the predetermined value. In response to this, because the power generation controlling means allows the fuel cell to generate more electric power, the oxidant gas supplied to the fuel cell is consumed preferably. And, because the battery controlling means allows the battery to be charged with the excess electric power of the fuel cell, the electric power corresponding to the required amount of power generation is output from the fuel cell and the battery.

Also, the present invention provides a fuel cell system in which when the command rotational speed within the first rotational speed region is calculated, if the fuel cell is in a warm-up operation, the compressor controlling means changes the first SOC to a second SOC which is greater than the first SOC.

According to the above described fuel cell system, when the command rotational speed within the first rotational speed region is calculated, if the fuel cell is in the warm-up operation, because the compressor controlling means changes the first SOC to the second SOC which is greater than the first SOC, it becomes easy to change the command rotational speed of the compressor to the rotational speed within the second rotational speed region. Along with the above, it becomes easy to increase the electric power generated by the fuel cell controlled by the power generation controlling means. And, as the electric power generated by the fuel cell is increased, self heat generation associated with power generation is increased, and the warm-up operation of the fuel cell can be accelerated.

Also, the present invention provides a fuel cell system in which when the command rotational speed within the first rotational speed region is calculated, if the battery is in a warm-up operation, the compressor controlling means changes the first SOC to a third SOC which is less than the first SOC.

According to the above described fuel cell system, when the command rotational speed within the first rotational speed region is calculated, if the battery is in the warm-up operation, because the compressor controlling means changes the first SOC to the third SOC which is less than the first SOC, it becomes easy to change the command rotational speed of the compressor to the rotational speed within the second rotational speed region. Along with the above, the battery controlled by the battery controlling means becomes likely to discharge. And, as the battery discharges, self heat generation associated with the discharge is increased, and the warm-up operation of the battery can be accelerated.

Also, the present invention provides a fuel cell system in which the compressor controlling means changes the predetermined value based on an operating state of the fuel cell system.

According to the above described fuel cell system, because the compressor controlling means changes the predetermined value based on the operating state of the fuel cell system, the first rotational speed region and the second rotational speed region can be set appropriately.

In addition, for example, when the fuel cell system is mounted on a fuel cell vehicle, the "operating state of the fuel cell system" is based on a noise and vibration based on a vehicle speed, or a level of an acceptable noise and vibration selected by a driver (in an embodiment described below, a first NV for a normal mode, and a second NV for a sports mode). When an external noise and vibration is large, and the acceptable noise and vibration becomes large, the predetermined value is changed to a higher value.

Also, the present invention provides a fuel cell system including a fuel gas supplying means for supplying a fuel gas to a fuel cell, in which when the command rotational speed within the first rotational speed region is calculated, if the command rotational speed is changed, the fuel gas supplying means changes a flow rate and/or a pressure of a fuel gas in response to a changed command rotational speed.

According to the above described fuel cell system, when the command rotational speed within the first rotational speed region is calculated, if the command rotational speed is changed, the fuel gas supplying means changes the flow rate and/or the pressure of the fuel gas in response to the changed command rotational speed. Therefore, the fuel gas can be supplied to the fuel cell in just proportion.

BRIEF DESCRIPTION OF THE DRAWINGS

The objects and features of the present invention will become more readily apparent from the following detailed description taken in conjunction with the accompanying drawings in which.

DETAILED DESCRIPTION OF THE INVENTION

Referring to FIGS. 1-5, one embodiment of the present invention will be explained.

<<Structure of Fuel Cell System>>

Figure 1:
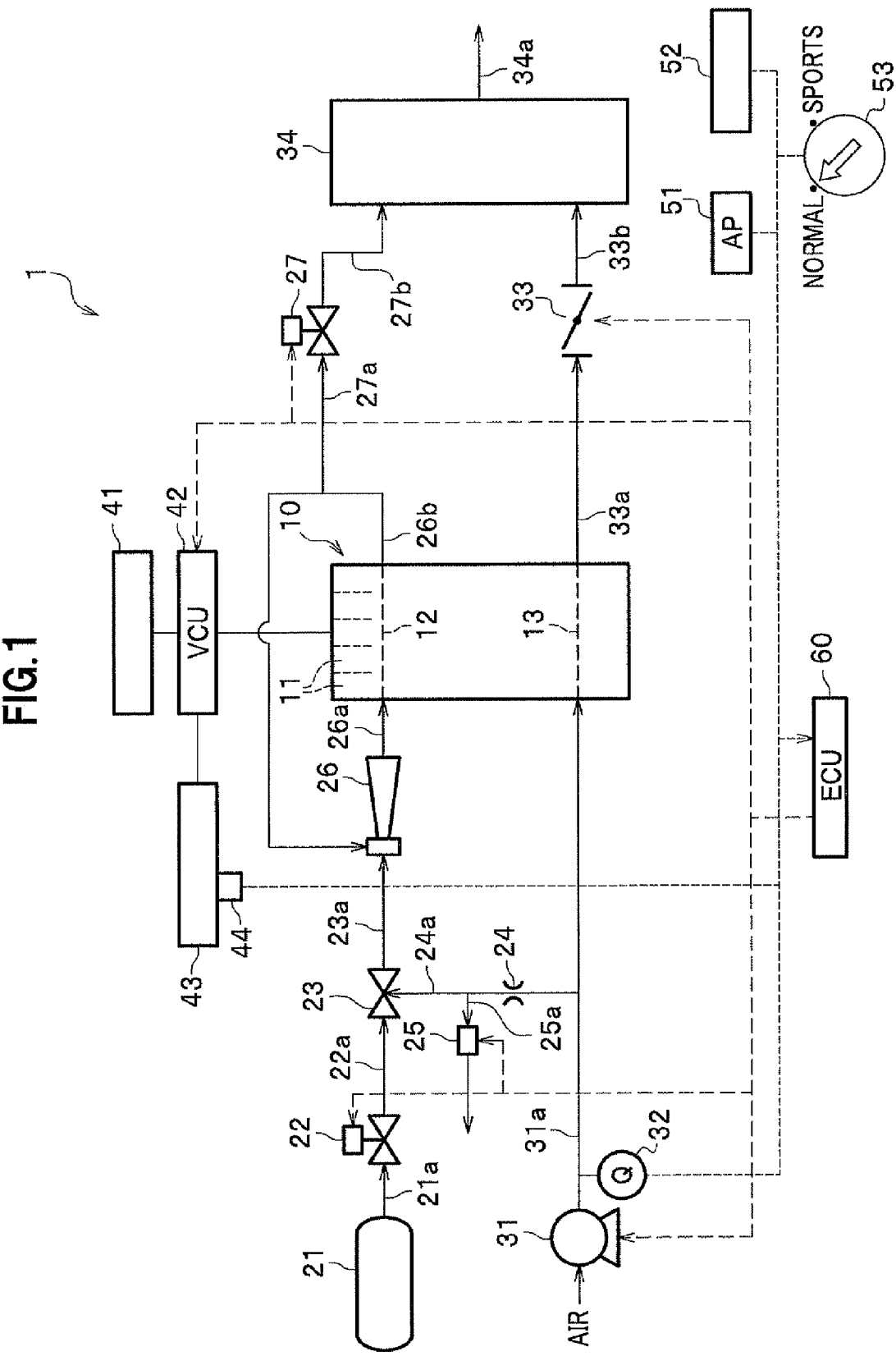
FIG. 1 is a block diagram of the fuel cell system according to the present invention.

A fuel cell system 1 of this embodiment shown in FIG. 1 is mounted on a fuel cell vehicle (not shown). The fuel cell system 1 includes a fuel cell stack 10; an anode system (fuel gas supplying means) for supplying/exhausting a hydrogen (fuel gas, reaction gas) to/from an anode of the fuel cell stack 10; a cathode system for supplying/exhausting an oxygen-containing air (oxidant gas, reaction gas) to/from a cathode of the fuel cell stack 10; an electric power consuming system for consuming an electric power generated by the fuel cell stack 10; an accelerator pedal (AP) 51; and an electronic control unit (ECU) 60.

<Fuel Cell Stack>

The fuel cell stack 10 is made by stacking a plurality of polymer electrolyte type single cells 11 (e.g., 200-400 cells). The plurality of single cells 11 are electrically connected in series. The single cell 11 includes a membrane electrode assembly (MEA) sandwiched between a conductive anode separator and a conductive cathode separator.

The MEA includes an electrolyte membrane (solid polymer electrolyte membrane) made of a monovalent cation-exchange membrane (e.g., perfluorosulfonate acid type), and an anode and a cathode provided in order to sandwich the electrolyte membrane. The anode and the cathode are mainly made of a conductive porous body, such as carbon paper, and contain catalysts (such as Pt and Ru) to allow an electrode reaction to occur at the anode and the cathode.

In the anode separator, through holes (referred to as inner manifolds) extending in a stacking direction of the single cells 11 for supplying/exhausting the hydrogen to/from the anode of each MEA, and grooves extending in a direction of a surface of the single cell 11 are formed. These through holes and grooves function as anode flow paths 12 (fuel gas flow paths).

In the cathode separator, through holes (referred to as inner manifolds) extending in the stacking direction of the single cells 11 for supplying/exhausting the hydrogen to/from the cathode of each MEA, and grooves extending in the direction of the surface of the single cell 11 are formed. These through holes and grooves function as cathode flow paths 13 (oxidant gas flow paths).

And, when the hydrogen is supplied to each anode through the anode flow path 12, an electrode reaction described by chemical formula (1) occurs. When the air is supplied to each cathode through the cathode flow path 13, an electrode reaction described by chemical formula (2) occurs. As a result, an open circuit voltage (OCV) is generated in each single cell 11. Next, when the fuel cell stack 10 is electrically connected to external circuits such as a traveling motor 41 (a power source of the fuel cell vehicle), etc., and a current is extracted, the fuel cell stack 10 begins power generation.

$$2H_2 \rightarrow 4H^+ + 4e^- \quad (1)$$

$$O_2 + 4H^+ + 4e^- \rightarrow 2H_2O \quad (2)$$

<Anode System>

An anode system includes a hydrogen tank 21 (fuel gas source) in which high-pressure hydrogen is stored, a normally-closed shutoff valve 22, a reducing valve 23 (pressure regulator), an ejector 26, and a normally-closed purge valve 27 (fuel gas exhaust valve).

The hydrogen tank 21 stores a high pressure hydrogen, and is connected to an inlet of the anode flow path 12 through a pipe 21a, the shutoff valve 22, a pipe 22a, the reducing valve 23, a pipe 23a, the ejector 26, and a pipe 26a. And, when the shutoff valve 22 is opened according to an open command from the ECU 60, the hydrogen stored in the hydrogen tank 21 is supplied to the anode flow path 12 through the pipe 22a.

Also, a pressure of air from a compressor 31 to the cathode flow path 13 is input to the reducing valve 23 through a pipe 24a having an orifice 24 as a signal pressure (pilot pressure). And, the reducing valve 23 controls the pressure of the hydrogen based on the pressure of the input air.

Further, the pipe 24a is connected to an injector 25 through a pipe 25a. And, the injector 25 functions as a relief valve (regulating valve). When the injector 25 is opened according to an open command from the ECU 60, a pressure of the pipe 25a and the pipe 24a, that is, the pilot pressure input to the reducing valve 23, is decreased. That is, the ECU 60 controls the injector 25 to change the pilot pressure input to the reducing valve 23, and thereby a secondary pressure of the reducing valve 23 (i.e., a pressure of the hydrogen in the anode flow path 12) is controlled.

An outlet of the anode flow path 12 is connected to an inlet of the ejector 26 at the upstream side of the fuel cell stack 10 through a pipe 26b (fuel gas circulating line). By the above connection, an anode off gas containing an unconsumed hydrogen exhausted from the anode flow path 12 (anode) is returned to the ejector 26, and results in a circulation of the hydrogen.

In addition, the pipe 26b has a liquid gas separator (not shown). With this liquid gas separator, a moisture content in the circulating hydrogen is separated.

The pipe 26b is connected to a diluter 34 through a pipe 27a, the purge valve 27, and a pipe 27b. The purge valve 27 is set to be opened by the ECU 60 if impurities (moisture vapor, nitrogen, and etc.) in the hydrogen circulating in the pipe 26b is exhausted (purged) at the time of power generation of the fuel cell stack 10.

In addition, for example, the ECU 60 is set to exhaust the impurities and to open the purge valve 27 if the lowest cell voltage applied to a cell voltage monitor (not shown) for detecting a voltage across the single cell 11 is less than the predetermined lowest cell voltage.

<Cathode System>

A cathode system includes the compressor 31, a flow rate sensor 32, a back-pressure regulating valve 33, and the diluter 34.

The compressor 31 is connected to an inlet of the cathode flow path 13 through a pipe 31a. When the compressor 31 is operated according to a command rotational speed from the ECU 60 (compressor controlling means), the compressor 31 takes in the oxygen-containing air to supply it to the cathode flow path 13. In addition, the rotational speed of the compressor 31 is set to be increased when a tramp-on amount (accelerator opening degrees) of the accelerator pedal (not shown) is increased to supply air at high flow rate and high pressure.

Also, the compressor 31 is fixed to a frame (not shown) of the fuel cell vehicle via a rubber mount, etc. (not shown).

Figure 2:
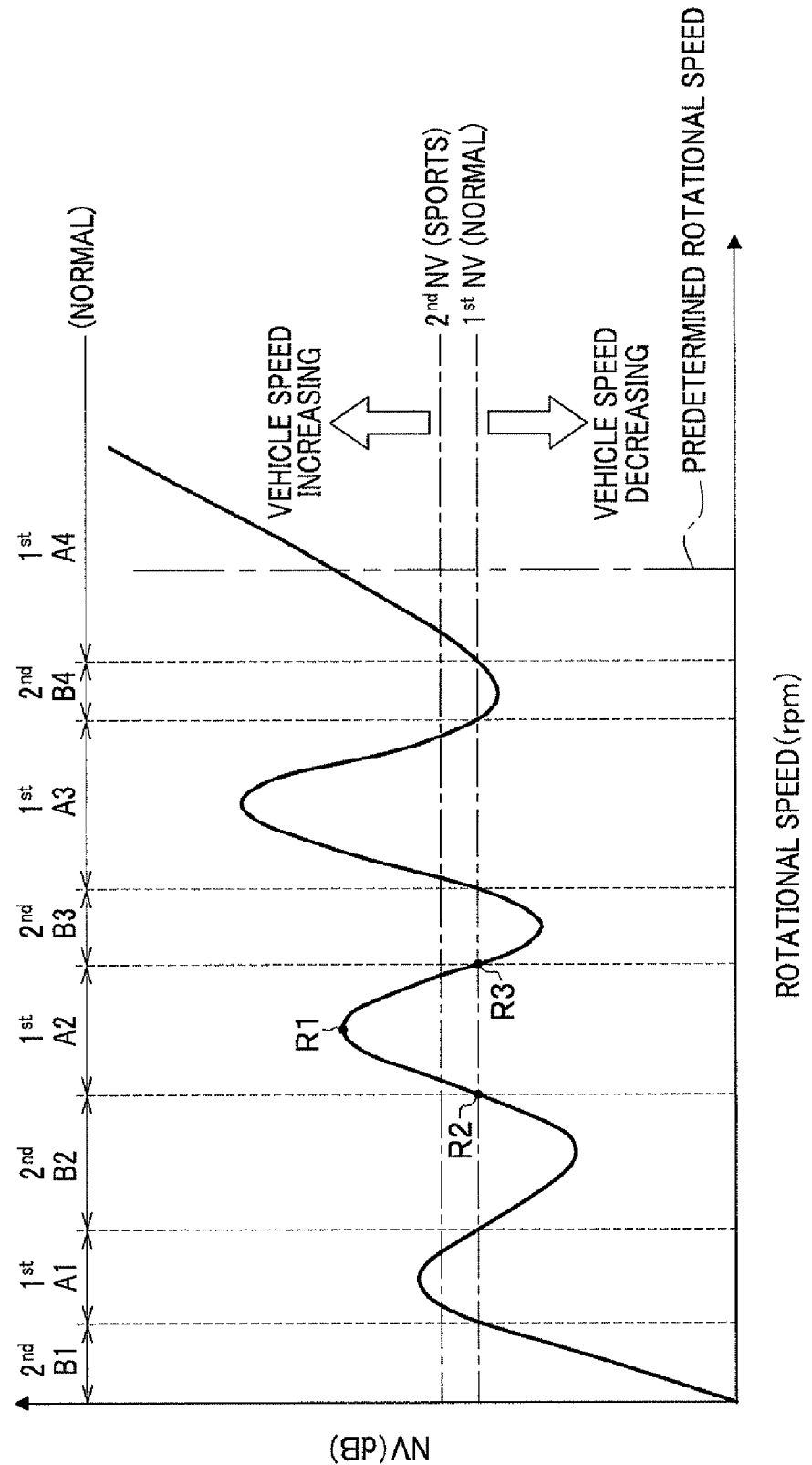
FIG. 2 is a map showing the relationship between the rotational speed and the NV of the compressor according to the present invention.

Further, in this embodiment, the fuel cell vehicle, and the driver, etc. are exposed to a NV (Noise Vibration, noise and vibration) generated by the compressor 31. As shown in FIG. 2, as the rotational speed increases, the NV tends to increase linearly after increasing unevenly.

Referring again to FIG. 1, the explanation will be continued.

The flow rate sensor 32 is provided on the pipe 31a to detect a mass flow rate (g/s) of the air supplied from the compressor 31 to the cathode flow path 13. And, the flow rate sensor 32 outputs a detected mass flow rate to the ECU 60. However, the location of the flow rate sensor 32 is not limited to the pipe 31a. For example, the flow rate sensor 32 may be provided on the air supply side of the compressor 31. Also, the flow rate sensor 32 may be a sensor for detecting a volume flow rate (L/s).

On the pipe 31a, a humidifier (not shown) is provided to humidify the air supplied to the cathode flow path 13. This humidifier has a hollow fiber membrane which provides water exchange between the air supplied to the cathode flow path 13 and a moist cathode off gas.

An outlet of the cathode flow path 13 is connected to the diluter 34 through a pipe 33a, the back-pressure regulating valve 33, and a pipe 33b. And, the moist cathode off gas exhausted from the cathode flow path 13 (cathode) is exhausted into the diluter 34 through the pipe 33a, etc. The diluter 34 dilutes the hydrogen contained in the anode off gas introduced from the pipe 27b by the cathode off gas, and exhausts the hydrogen to the external of the vehicle through a pipe 34a.

The back-pressure regulating valve 33 is a normally-opened valve (e.g., a butterfly valve, etc.), and an opening degree of the back-pressure regulating valve 33 is controlled by the ECU 60. More particularly, when a tramp-on amount of the accelerator pedal 51 is increased, the ECU 60 decreases an opening degree of the back-pressure regulating valve 33 in order to supply air at high pressure.

<Electric Power Consuming System>

An electric power consuming system includes a traveling motor 41, a voltage control unit (VCU) 42 (a current controlling means), a battery 43 (charging/discharging unit), and a SOC sensor 44 (SOC detecting means). The traveling motor 41 is connected to an output terminal (not shown) of the fuel cell stack 10 via the VCU 42. The battery 43 is connected to the VCU 42. In addition, an inverter (Power Drive Unit: PDU) located between the traveling motor 41 and the VCU 42 is omitted.

The traveling motor 41 is an outer load to function as a power source of the fuel cell vehicle.

The VCU 42 controls (limits) power generation (output current, output voltage) of the fuel cell stack 10 according to a command current sent from the ECU 60, and includes electronic circuits such as a DC/DC chopper, and a DC/DC converter, etc. That is, when the command current sent to the VCU 42 increases, the current extracted from the fuel cell stack 10 increases. As a result, more hydrogen and more air are consumed in the fuel cell stack 10. That is, the power generation controlling means for controlling power generation of the fuel cell stack 10 includes the VCU 42, and the ECU 60.

Also, the VCU 42 includes an electronic circuit for controlling the electric power (i.e., charging/discharging) of the battery 43 according to a command sent from the ECU 60. That is, a battery controlling means for controlling charging/discharging of the battery 43 includes the VCU 42, and the ECU 60.

For example, the battery 43 includes a plurality of lithium-ion type secondary cell.

The SOC sensor 44 detects a SOC (state of charge) of the battery 43. For example, the SOC sensor 44 includes a voltage sensor for detecting an output voltage of the battery 43, and a current sensor for detecting a current charged to/discharged from the battery 43. And, the SOC sensor 44 calculates the SOC of the battery 43 based on the detected voltage and current, and outputs the calculated SOC to the ECU 60.

Or, the SOC sensor 44 may output the voltage and the current to the ECU 60, and the ECU 60 may calculate the SOC.

<Accelerator Pedal, Etc>

The accelerator pedal 51 (AP) is tramped on by a driver in order to accelerate a fuel cell vehicle, and is located at driver's feet. And, the accelerator pedal 51 outputs a tramp-on amount (AP amount), i.e., a required amount of power generation from the driver, to the ECU 60.

A vehicle speed sensor 52 detects a vehicle speed of the fuel cell vehicle (operating state of the fuel cell system 1), and is provided in place. And, the vehicle speed sensor 52 outputs a vehicle speed to the ECU 60.

A mode selector 53 allows the driver to select a normal mode or a sports mode (both of them are operating states of the fuel cell system 1) as an operation mode of the fuel cell vehicle (fuel cell system 1). The mode selector 53 is provided on an instrument panel. And, the mode selector 53 outputs a signal corresponding to the selected normal mode or sports mode to the ECU 60.

For the driver, an acceptable magnitude of a NV (Noise Vibration, noise and vibration) generated by the compressor 31 in the normal mode differs from that in the sports mode. As shown in FIG. 2, a first acceptable NV (predetermined value) in the sports mode is set to be greater than a second acceptable NV (predetermined value) in the normal mode. That is, when a NV greater than the first NV is generated by the compressor 31 in the normal mode, or when a NV greater than the second NV is generated by the compressor 31 in the sports mode, a quietness of the fuel cell vehicle degrades. As a result, the driver feels uncomfortable. That is, when a NV is equal to or less than the first NV is generated by the compressor 31 in the normal mode, and when a NV is equal to or less than the second NV is generated by the compressor 31 in the sports mode, the quietness of the fuel cell vehicle is kept. As a result, the driver does not feel uncomfortable.

In addition, such a first NV, and a second NV relate to a specification of the compressor 31 (e.g., a rated output, etc), and a mounting state of the compressor 31 on the fuel cell vehicle. The first NV and the second NV are predetermined by tests, and are prestored in the ECU 60.

In this embodiment, as described above, as the rotational speed increases, the NV generated by the compressor 31 tends to increase linearly after increasing unevenly (see FIG. 2).

And, in the normal mode, the compressor 31 generates NVs which are greater than the first NV in first rotational speed regions A1, A2, A3, and A4, and generates NVs which are equal to or less than the first NV in second rotational speed regions B1, B2, B3, and B4. As the rotational speed increases, the first rotational speed region alternates with the second rotational speed region. Likewise, in the sports mode, the compressor 31 generates NVs which are greater than the second NV in the first rotational speed regions, and generates NVs which are equal to or less than the second NV in the second rotational speed regions. As the rotational speed increases, the first rotational speed region alternates with the second rotational speed region.

In FIG. 2, although the first rotational speed regions and the second rotational speed regions in the normal mode are drawn, the first rotational speed regions and the second rotational speed regions in the sports mode are omitted.

Also, as the vehicle speed of the fuel cell vehicle increases, traveling noises (e.g., a tire noise, and a wind noise, etc.) generated by other components than the compressor 31 and a vibration associated with traveling increase. Therefore, as described below, the first NV and the second NV are corrected based on the vehicle speed, and the first rotational speed region and the second rotational speed region are set appropriately in the normal mode and the sports mode. That is, when the vehicle speed increases, the first NV and the second NV are corrected to be increased. On the contrary, when the vehicle speed decreases, the first NV and the second NV are corrected to be decreased.

<ECU>

The ECU 60 controls the fuel cell system 1 electronically, and includes CPU, ROM, RAM, various types of interfaces, and an electronic circuit, etc. And, the ECU 60 controls various types of equipments appropriately according to a program stored in the ECU 60 itself.

Also, the ECU 60 sets the first rotational speed region and the second rotational speed region of the compressor 31 appropriately.

Further, when a command rotational speed within the first rotational speed region is calculated, the ECU 60 determines whether the command rotational speed will be increased or decreased based on a current SOC, and a reference value of any one of the first SOC, the second SOC, and the third SOC. The first SOC, the second SOC, and the third SOC are set in consideration of charging auxiliary electric power and regenerative electric power of the fuel cell stack 10.

In particular, the first SOC is a reference value used in a normal operation, and is set to, for example, 50%.

The second SOC is a reference value used in a warm-up operation of the fuel cell stack 10. In order to increase power generation of the fuel cell stack 10 without discharging of the battery 43, the second SOC is set to, for example, 80% which is greater than the first SOC. That is, during the warm-up operation of the fuel cell stack 10, the reference value is changed from the first SOC to the second SOC.

The third SOC is a reference value used in a warm-up operation of the battery 43. In order to allow the battery 43 to discharge more, the third SOC is set to, for example, 30% which is less than the first SOC. That is, during the warm-up operation of the battery 43, the reference value is changed from the first SOC to the third SOC.

In addition, the first SOC, the second SOC, and the third SOC relate to specifications of the fuel cell stack 10 and the battery 43, are predetermined by tests, and are prestored in the ECU 60. However, the first SOC, the second SOC, and the third SOC are not limited to the above values, and may be changed properly.

<<Behavior of Fuel Cell System>>

Figure 3A:
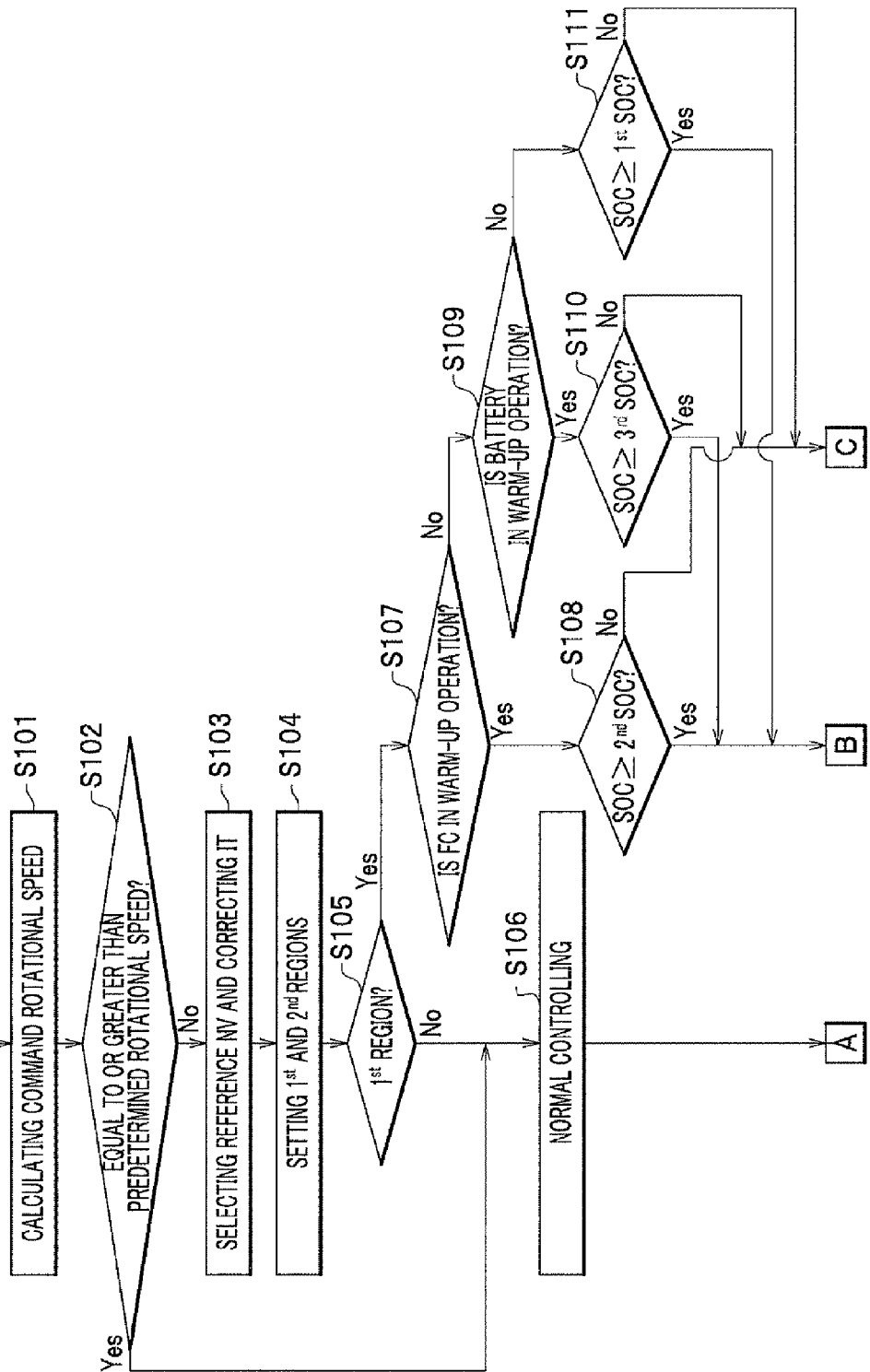
FIGS. 3A and 3B show a flowchart of the process performed by the fuel cell system according to the present invention.
Figure 3B:
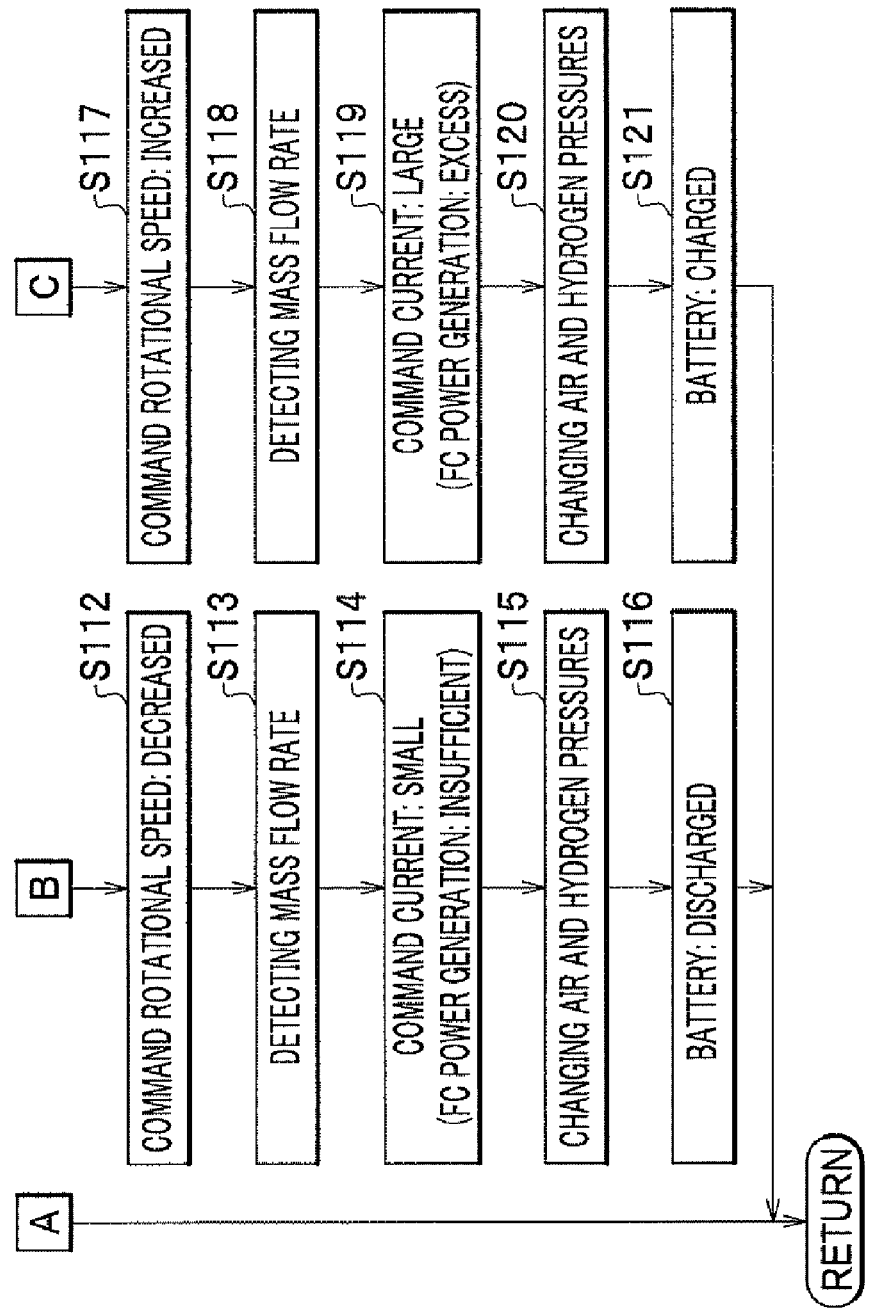

Next, referring to FIGS. 3A and 3B, behavior of the fuel cell system 1 will be explained.

In addition, at an initial state, the VCU 42 is controlled in response to the tramp-on amount (the required amount of power generation) of the accelerator pedal 51, and the fuel cell stack 10 generates electric power.

Figure 4:
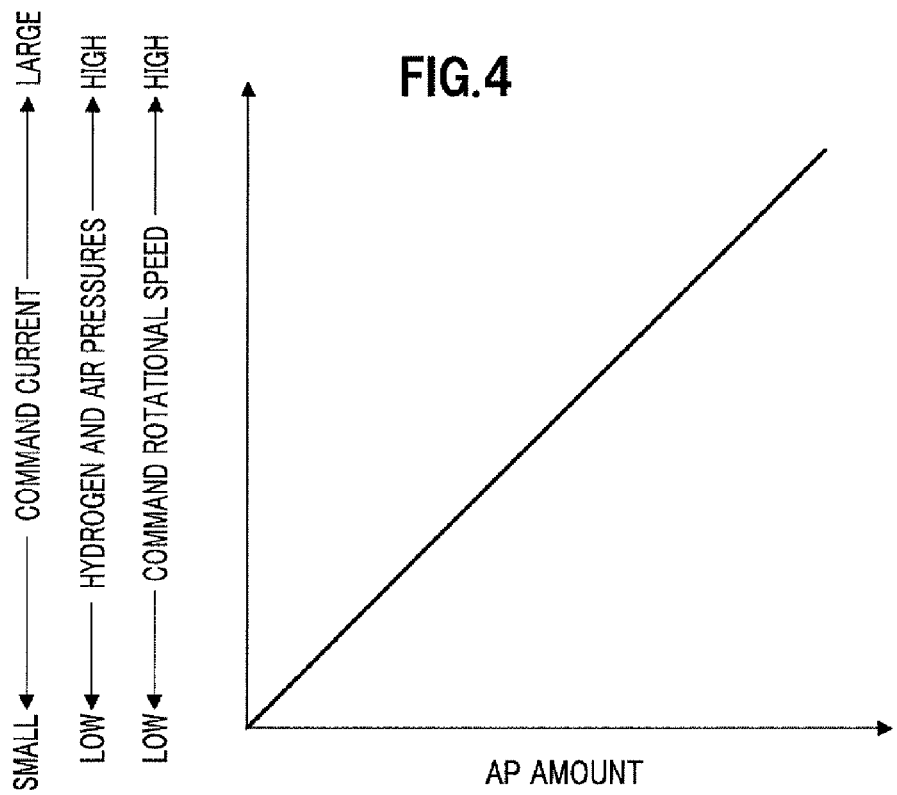
FIG. 4 is a map showing the relationship between the tramp-on amount of the accelerator pedal and the command rotational speed, the hydrogen and air pressure, and the command current.

In step S101, the ECU 60 calculates a command rotational speed issued to the compressor 31 based on the tramp-on amount (AP amount) of the accelerator pedal 51 and a map shown in FIG. 4. The map shown in FIG. 4 is predetermined by tests, and is prestored in the ECU 60. As shown in FIG. 4, as the tramp-on amount of the accelerator pedal 51 increases, the command rotational speed increases.

Also, the ECU 60 calculates a target hydrogen pressure in the anode flow path 12, a target air pressure in the cathode flow path 13, and a command current issued to the VCU 42 based on the tramp-on amount (AP amount) of the accelerator pedal 51 and the map shown in FIG. 4. As shown in FIG. 4, as the tramp-on amount of the accelerator pedal 51 increases, the target hydrogen pressure in the anode flow path 12, and the target air pressure in the cathode flow path 13 increase. Also,
as the tramp-on amount of the accelerator pedal 51 increases, the command current (i.e., the current extracted from the fuel cell stack 10) issued from the ECU 60 to the VCU 42 increases.

In step S102, the ECU 60 determines whether the command rotational speed calculated in step S101 is equal to or greater than a predetermined rotational speed (see FIG. 2).

As shown in FIG. 2, the predetermined rotational speed exists within the region in which the NV of the compressor 31 increases linearly. If processes in steps S107-S120 described below are performed for the command rotational speed within such region, and the command rotational speed is decreased in order to decrease the command current, the electric power of the fuel cell stack 10 becomes too small relative to the tramp-on amount (the required amount of power generation) of the accelerator pedal 51. As a result, if the battery 43 is discharged in order to compensate for an insufficient electric power, the electric power corresponding to the required amount of power generation is not output, and the rotational speed is set to a rotational speed which may damage traveling of the fuel cell vehicle. In addition, such predetermined rotational speed is predetermined by tests, and is prestored in the ECU 60.

And, if the ECU 60 determines that the command rotational speed calculated in step S101 is equal to or greater than the predetermined rotational speed (S102: Yes), the process proceeds to step S106 in the ECU 60. On the other hand, if the command rotational speed calculated in step S101 is determined not to be equal to or greater than the predetermined rotational speed (S102: No), the process proceeds to step S103 in the ECU 60.

In step S103, the ECU 60 selects a reference NV (a predetermined value) and corrects it. As shown in FIG. 2, the reference NV is a NV used as a criterion to divide the rotational speed region of the compressor 31 into the first rotational speed region and the second rotational speed region.

In particular, the ECU 60 determines whether the current mode is the normal mode or the sports mode based on a signal input from the mode selector 53. And, if the ECU 60 determines that the normal mode is selected, the ECU 60 selects the first NV as the reference NV. On the other hand, if the ECU 60 determines that the sports mode is selected, the ECU 60 selects the second NV as the reference NV.

Next, based on the vehicle speed input from the vehicle speed sensor 52, the ECU 60 corrects the first NV (or the second NV) selected as the reference NV. In particular, for example, when a current vehicle speed is a reference vehicle speed (e.g., 20 km/h), a correction value is set to 0 (dB). As the current vehicle speed becomes greater than the reference vehicle speed, the correction value is increased in the positive direction, and as the current vehicle speed becomes less than the reference vehicle speed, the correction value is increased in the negative direction. As a result, the first or second NV is corrected.

In this way, the reference NV (predetermined value) is changed based on the operating state of the fuel cell system 1 (fuel cell vehicle).

In step S104, the ECU 60 sets the first rotational speed region (denoted by "1$^{st}$ region" in FIG. 3A) and the second rotational speed region (denoted by "2$^{nd}$ region" in FIG. 3A) based on a rotational speed—NV curve of the compressor 31 (see FIG. 2) and the corrected first or second NV. In particular, one region within which the NV of the compressor 31 is greater than the corrected first or second NV is set as the first rotational speed region, and another region within which the NV of the compressor 31 is equal to or less than the corrected first or second NV is set as the second rotational speed region.

In step S105, the ECU 60 determines whether the command rotational speed calculated in step S101 is within the first rotational speed region set in step S104.

If the ECU 60 determines that the command rotational speed is within the first rotational speed region (S105: Yes), the process proceeds to step S107 in the ECU 60. On the other hand, if the ECU 60 determines that the command rotational speed is not within the first rotational speed region (S105: No), the process proceeds to step S106 in the ECU 60.

In step S106, the ECU 60 controls the fuel cell system 1 normally.

In particular, the ECU 60 commands the compressor 31 to rotate at the command rotational speed calculated in step S101. Also, the ECU 60 commands the injector 25 to open and close so that a pressure is adjusted to the target hydrogen pressure calculated in step S101 in order to control the pilot pressure and the secondary pressure of the reducing valve 23. Further, the ECU 60 controls the opening degree of the back-pressure regulating valve 33 so that a pressure is adjusted to the target air pressure calculated in step S101. And, the ECU 60 outputs the command current calculated in step S101 to the VCU 42, and the VCU 42 controls the output current of the fuel cell stack 10 based on the input command current.

After that, the process in the ECU 60 reverts back to "START" via "RETURN".

In step S107, the ECU 60 determines whether the fuel cell stack 10 is in the warm-up operation. If the ECU 60 determines that the fuel cell stack 10 is in the warm-up operation (S107: Yes), the process proceeds to step S108 in the ECU 60. On the other hand, if the ECU 60 determines that the fuel cell stack 10 is not in the warm-up operation (S107: No), the process proceeds to step S109 in the ECU 60.

For example, the determination whether the fuel cell stack 10 is in the warm-up operation may be performed by temperature sensors provided on a pipe 26b and/or a pipe 33a. If the temperatures of the anode off gas and/or the cathode off gas are equal to or greater than a first warm-up completion temperature (e.g., 30-40 degree centigrade), the warm-up operation is determined to be completed. Or, the determination may be performed by utilizing a clock signal in the ECU 60. When a first warm-up completion time (e.g., 3-10 minutes) has elapsed after the fuel cell system 1 was started, the warm-up operation may be determined to be completed. In such structures, the first warm-up completion temperature and the first warm-up completion time are predetermined by tests, and are prestored in the ECU 60.

In step S108, the ECU 60 determines whether the current SOC of the battery 43 input from the SOC sensor 44 is equal to or greater than a second SOC (e.g., 80%).

If the ECU 60 determines that the current SOC is equal to or greater than the second SOC (S108: Yes), the process proceeds to step S112 in the ECU 60. On the other hand, If the ECU 60 determines that the current SOC is less than the second SOC (S108: No), the process proceeds to step S117 in the ECU 60.

In step S109, the ECU 60 determines whether the battery 43 is in the warm-up operation. If the ECU 60 determines that the battery 43 is in the warm-up operation (S109: Yes), the process proceeds to step S110 in the ECU 60. On the other hand, if the ECU 60 determines that the battery 43 is not in the warm-up operation (S109: No), the process proceeds to step S111 in the ECU 60.

In addition, the process in step S107 may be performed next to the process in step S109.

For example, the determination whether the battery 43 is in the warm-up operation may be performed by a temperature sensor provided on the battery 43. If the temperature of the battery 43 detected by the temperature sensor is equal to or greater than a second warm-up completion temperature (e.g., 10-20 degree centigrade), the warm-up operation is determined to be completed. Or, the determination may be performed by utilizing a clock signal in the ECU 60. When a second warm-up completion time (e.g., 3-10 minutes) have elapsed after the fuel cell system 1 was started, the warm-up operation may be determined to be completed. In such structures, the second warm-up completion temperature and the second warm-up completion time are predetermined by tests, and are prestored in the ECU 60.

In step S110, the ECU 60 determines whether the current SOC of the battery 43 input from the SOC sensor 44 is equal to or greater than a third SOC (e.g., 30%).

If the ECU 60 determines that the current SOC is equal to or greater than the third SOC (S110: Yes), the process proceeds to step S112 in the ECU 60. On the other hand, if the ECU 60 determines that the current SOC is less than the third SOC (S110: No), the process proceeds to step S117 in the ECU 60.

In step S111, the ECU 60 determines whether the current SOC of the battery 43 input from the SOC sensor 44 is equal to or greater than a first SOC (e.g., 50%).

If the ECU 60 determines that the current SOC is equal to or greater than the first SOC (S111: Yes), the process proceeds to step S112 in the ECU 60. On the other hand, if the ECU 60 determines that the current SOC is less than the first SOC (S111: No), the process proceeds to step S117 in the ECU 60.

<Decreasing Command Rotational Speed>

Next, step S112, to which the process proceeds to if the determination in each of steps S108, S110, and S111 is "Yes", will be explained.

In step S112, the ECU 60 changes the command rotational speed within the first rotational speed region to an upper limit of the rotational speed within the second rotational speed region which is below the first rotational speed region, and uses the upper limit as the command rotational speed. Next, the ECU 60 commands the compressor 31 to rotate at the command rotational speed. That is, the command rotational speed is decreased.

By the above procedure, the NV generated by the compressor 31 is the reference NV, and becomes equal to or less than the first or second NV corrected in step S103 to be suppressed. As a result, the quietness of the fuel cell vehicle is kept, and the driver does not feel uncomfortable.

More particularly, for example, when the normal mode is selected, the correction value based on the vehicle speed in step S103 is equal to "0", and the reference NV is the first NV, if the command rotational speed calculated in step S101 is within the first rotational speed region A2 (denoted as "R1" in FIG. 2), this command rotational speed (R1) is changed to an upper limit of the rotational speed within the second rotational speed region B2 which is below the first rotational speed region A2 (denoted as "R2" in FIG. 2), and the upper limit is used as the command rotational speed. And, the ECU 60 commands the compressor 31 to rotate at the changed command rotational speed (R2). By the above procedure, the NV generated by the compressor 31 becomes equal to or less than the first NV.

In step S113, the ECU 60 detects the current mass flow rate (g/s) of the air with the flow rate sensor 32. In addition, because the command rotational speed of the compressor 31 is decreased in step S112, the mass flow rate is decreased.

Or, the mass flow rate may be estimated based on the rotational speed of the compressor 31.

Figure 5:
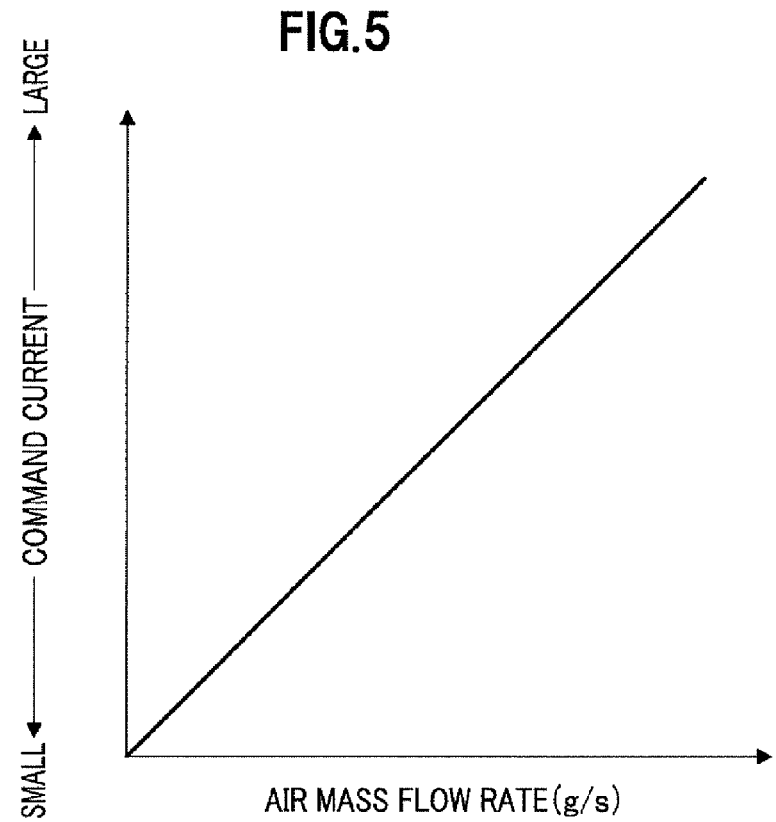
FIG. 5 is a map showing the relationship between the air flow rate and the command current.

In step S114, the ECU 60 changes (corrects) the command current for commanding the VCU 42 (i.e., the output current of the fuel cell stack 10) based on the current mass flow rate (g/s) of the air and the map shown in FIG. 5. Next, the ECU 60 sends the changed command current to the VCU 42, and extracts the changed command current from the fuel cell stack 10. In addition, the map shown in FIG. 5 is predetermined by tests, and is prestored in the ECU 60. Also, as shown in FIG. 5, the mass flow rate of the air increases, the command current increases linearly.

As described above, because the mass flow rate of the air is decreased, the command current is changed to be small relative to a value calculated in step S101. As a result, an amount of power generation of the fuel cell stack 10 becomes insufficient for the required amount of power generation from the accelerator pedal 51.

In step S115, the ECU 60 changes a target hydrogen pressure in the anode flow path 12 and a target air pressure in the cathode flow path 13 based on the changed command current and the map shown in FIG. 4. Next, the ECU 60 controls the injector 25, and the back-pressure regulating valve 33 so that pressures are adjusted to the changed target hydrogen pressure and the changed target air pressure.

Because the command current is changed to be decreased, the target hydrogen pressure and the target air pressure are changed (corrected) to be decreased. In addition, when the target hydrogen pressure is decreased as described above, a hydrogen flow rate in the anode flow path 12 is changed to be decreased.

In step S116, the ECU 60 controls the VCU 42 so that the battery 43 is discharged in order to compensate for the insufficient electric power of the fuel cell stack 10. By the above procedure, the electric power corresponding to the required amount of power generation from the accelerator pedal 51 is supplied from the fuel cell stack 10 and the battery 43 to the traveling motor 41. As a result, the fuel cell vehicle travels preferably.

After that, the process in the ECU 60 reverts back to "START" via "RETURN".

<Increasing Command Rotational Speed>

Next, step S117, to which the process proceeds to if the determination in each of steps S108, S110, and S111 is "No", will be explained.

In step S117, the ECU 60 changes the command rotational speed within the first rotational speed region to an lower limit of the rotational speed within the second rotational speed region which is above the first rotational speed region, and uses the lower limit as the command rotational speed. Next, the ECU 60 commands the compressor 31 to rotate at the command rotational speed. That is, the command rotational speed is increased.

By the above procedure, the NV generated by the compressor 31 is the reference NV, and becomes equal to or less than the first or second NV corrected in step S103 to be suppressed. As a result, the quietness of the fuel cell vehicle is kept, and the driver does not feel uncomfortable.

In addition, when the calculated command rotational speed is within the first rotational speed region A4 on a faster speed side shown in FIG. 2, and is equal to or less than the predetermined rotational speed, the command rotational speed is decreased to a value within the second rotational speed region B4 because the rotational speed can not be increased.

More particularly, for example, when the normal mode is selected, the correction value based on the vehicle speed in step S103 is equal to "0", and the reference NV is the first NV, if the command rotational speed calculated in step S101 is within the first rotational speed region A2 (denoted as "R1" in FIG. 2), this command rotational speed (R1) is changed to a lower limit of the rotational speed within the second rotational speed region B3 which is above the first rotational speed region A2 (denoted as "R3" in FIG. 2), and the lower limit is used as the command rotational speed. And, the ECU 60 commands the compressor 31 to rotate at the changed command rotational speed (R3). By the above procedure, the NV generated by the compressor 31 becomes equal to or less than the first NV.

In step S118, the ECU 60 detects the current mass flow rate (g/s) of the air with the flow rate sensor 32. In addition, because the command rotational speed of the compressor 31 is increased in step S112, the mass flow rate is increased.

In step S119, the ECU 60 changes (corrects) the command current for commanding the VCU 42 (i.e., the output current of the fuel cell stack 10) based on the current mass flow rate (g/s) of the air and the map shown in FIG. 5. Next, the ECU 60 sends the changed command current to the VCU 42, and extracts the changed command current from the fuel cell stack 10. As described above, because the mass flow rate of the air is increased, the command current is changed to be large relative to a value calculated in step S101. As a result, an amount of power generation of the fuel cell stack 10 becomes excess for the required amount of power generation from the accelerator pedal 51.

In step S120, the ECU 60 changes a target hydrogen pressure in the anode flow path 12 and a target air pressure in the cathode flow path 13 based on the changed command current and the map shown in FIG. 4. Next, the ECU 60 controls the injector 25, and the back-pressure regulating valve 33 so that pressures are adjusted to the changed target hydrogen pressure and the changed target air pressure.

Because the command current is changed to be increased, the target hydrogen pressure and the target air pressure are changed (corrected) to be increased. In addition, when the target hydrogen pressure is increased as described above, a hydrogen flow rate in the anode flow path 12 is changed to be increased.

In step S121, the ECU 60 controls the VCU 42 so that the battery 43 is charged with the excess electric power of the fuel cell stack 10. By the above procedure, the electric power corresponding to the required amount of power generation from the accelerator pedal 51 is supplied from the fuel cell stack 10 and the battery 43 to the traveling motor 41. As a result, the fuel cell vehicle travels preferably.

After that, the process in the ECU 60 reverts back to "START" via "RETURN".

<<Effect of Fuel Cell System>>

By the fuel cell system 1 described above, the following effects are achieved.

Because the compressor 31 is not rotated at the command rotational speed within the first rotational speed region, the NV generated by the compressor 31 is suppressed. As a result, the quietness of the fuel cell vehicle is kept, and the driver does not feel uncomfortable.

It will be appreciated that, although specific embodiments of the invention have been described herein for purposes of illustration, various modifications may be made without departing from the scope of the invention. Accordingly, the invention is not limited except by the appended claims.

In the embodiment described above, the battery 43 is charged with the excess electric power of the fuel cell stack 10. However, for example, an air conditioning heater, and other equipments may be operated by the excess electric power.

In the embodiment described above, as the reference NV, the ECU 60 selects the first NV (normal mode) or the second NV (sports mode) based on the signal input from the mode selector 53. However, for example, the ECU 60 may select the first NV or the second NV based on a variation ($\Delta\theta/\Delta t$) in the tramp-on amount of the accelerator pedal 51. That is, the ECU 60 may selects the second NV as the reference NV when the variation ($\Delta\theta/\Delta t$) in the accelerator pedal 51 is equal to or greater than a predetermined variation.

In the embodiment described above, the present invention is applied to the fuel cell system 1 mounted on the fuel cell vehicle. However, for example, the present invention may be applied to fuel cell systems mounted on a two-wheeled motor vehicle, a train, and a ship, domestic or commercial stationary fuel cell systems, and a fuel cell system incorporated in a water heater system. Also, the present invention may be applied to other systems.

What is claimed is:

1. A fuel cell system comprising:
    a fuel cell;
    a compressor for supplying an oxidant gas to the fuel cell, having a first rotational speed region within which as a rotational speed increases, a noise becomes greater than a predetermined value, and a second rotational speed region within which as the rotational speed increases, the noise becomes equal to or less than the predetermined value; and
    means for controlling the compressor by calculating a command rotational speed for commanding the compressor based on a required amount of power generation,
    wherein the means for controlling the compressor prohibits the compressor from rotating at a rotational speed within the first rotational speed region, and when the command rotational speed within the first rotational speed region is calculated, the command rotational speed is changed to a rotational speed within the second rotational speed region which is above the first rotational speed region, or the command rotational speed is changed to a rotational speed within the second rotational speed region which is below the first rotational speed region; and
    means for controlling power generation of the fuel cell;
    a battery for charging/discharging an electric power generated by the fuel cell;
    means for detecting a SOC of the battery; and
    means for controlling the charging/discharging of the battery,
    wherein when the command rotational speed within the first rotational speed region is calculated,
        if the SOC detected by the means for detecting is equal to or greater than a first SOC, the means for controlling the compressor changes the command rotational speed to a rotational speed within the second rotational speed region, the means for controlling power generation allows the fuel cell to generate less electric power, and the means for controlling the battery allows the battery to discharge in order to compensate for an insufficient power generation of the fuel cell, and
        if the SOC detected by the means for detecting is less than the first SOC, the means for controlling the compressor changes the command rotational speed to the rotational speed within the second rotational speed region, the means for controlling the power generation allows the fuel cell to generate more electric power, and the means for controlling the battery allows the battery to be charged with an excess electric power of the fuel cell.

2. A fuel cell system comprising:
    a fuel cell;
    a compressor for supplying an oxidant gas to the fuel cell, having a first rotational speed region within which as a rotational speed increases, a vibration becomes greater than a predetermined value, and a second rotational speed region within which as the rotational speed increases, the vibration becomes equal to or less than the predetermined value, and the first rotational speed region alternates with the second rotational speed region; and
    means for controlling the compressor by calculating a command rotational speed for commanding the compressor based on a required amount of power generation,
    wherein the means for controlling the compressor prohibits the compressor from rotating at a rotational speed within the first rotational speed region, and when the command rotational speed within the first rotational speed region is calculated, the command rotational speed is changed to a rotational speed within the second rotational speed region which is above the first rotational speed region, or the command rotational speed is changed to a rotational speed within the second rotational speed region which is below the first rotational speed region; and
    means for controlling power generation of the fuel cell;
    a battery for charging/discharging an electric power generated by the fuel cell;
    means for detecting a SOC of the battery; and
    means for controlling the charging/discharging of the battery,
    wherein when the command rotational speed within the first rotational speed region is calculated,
        if the SOC detected by the means for detecting is equal to or greater than a first SOC, the means for controlling the compressor changes the command rotational speed to a rotational speed within the second rotational speed region, the means for controlling power generation allows the fuel cell to generate less electric power, and the means for controlling the battery allows the battery to discharge in order to compensate for an insufficient power generation of the fuel cell, and
        if the SOC detected by the means for detecting a SOC is less than the first SOC, the means for controlling the compressor changes the command rotational speed to the rotational speed within the second rotational speed region, the means for controlling the power generation allows the fuel cell to generate more electric power, and the means for controlling the battery allows the battery to be charged with an excess electric power of the fuel cell.

3. The fuel cell system according to claim 1, wherein when the command rotational speed within the first rotational speed region is calculated, if the fuel cell is in a warm-up operation, the means for controlling the compressor changes the first SOC to a second SOC which is greater than the first SOC.

4. The fuel cell system according to claim 2, wherein when the command rotational speed within the first rotational speed region is calculated, if the fuel cell is in a warm-up operation, the means for controlling the compressor changes the first SOC to a second SOC which is greater than the first SOC.

5. The fuel cell system according to claim 1, wherein when the command rotational speed within the first rotational speed region is calculated, if the battery is in a warm-up operation, the means for controlling the compressor changes the first SOC to a third SOC which is less than the first SOC.

6. The fuel cell system according to claim 2, wherein when the command rotational speed within the first rotational speed region is calculated, if the battery is in a warm-up operation, the means for controlling the compressor changes the first SOC to a third SOC which is less than the first SOC.

7. The fuel cell system according to claim 1, wherein the means for controlling the compressor changes the predetermined value based on an operating state of the fuel cell system.

8. The fuel cell system according to claim 2, wherein the means for controlling the compressor changes the predetermined value based on an operating state of the fuel cell system.

9. The fuel cell system according to claim 1, further comprising:
   a means for supplying a fuel gas to a fuel cell,
      wherein when the command rotational speed within the first rotational speed region is calculated, if the command rotational speed is changed, the means for supplying fuel gas changes a flow rate and/or a pressure of a fuel gas in response to a changed command rotational speed.

10. The fuel cell system according to claim 2, further comprising:
   a fuel gas supplying means for supplying a fuel gas to a fuel cell,
      wherein when the command rotational speed within the first rotational speed region is calculated, if the command rotational speed is changed, the means for supplying fuel gas changes a flow rate and/or a pressure of a fuel gas in response to a changed command rotational speed.

* * * * *